United States Patent [19]

Dickert, Jr. et al.

[11] Patent Number: 4,626,362
[45] Date of Patent: Dec. 2, 1986

[54] ADDITIVE SYSTEMS FOR CONTROL OF FLUID LOSS IN AQUEOUS DRILLING FLUIDS AT HIGH TEMPERATURES

[75] Inventors: Joseph J. Dickert, Jr., Yardley, Pa.; Israel J. Heilweil, Princeton, N.J.

[73] Assignee: Mobil Oil Corporation, New York, N.Y.

[21] Appl. No.: 722,027

[22] Filed: Apr. 11, 1985

[51] Int. Cl.$^4$ ............................................. C09K 7/02
[52] U.S. Cl. .................................. 252/8.51; 252/8.514
[58] Field of Search ......................... 252/8.5 A, 8.51 P

[56] References Cited

U.S. PATENT DOCUMENTS

| | | | |
|---|---|---|---|
| 2,552,775 | 5/1951 | Fischer et al. | 252/8.5 |
| 4,172,800 | 10/1979 | Walker | 252/8.5 |
| 4,201,678 | 5/1980 | Pye et al. | 252/8.5 |
| 4,268,400 | 5/1981 | Lucas et al. | 252/8.5 |
| 4,283,517 | 8/1981 | Perricone et al. | 526/229 |
| 4,293,427 | 10/1981 | Lucas et al. | 252/8.5 |
| 4,309,329 | 1/1982 | Lucas et al. | 252/8.5 X |
| 4,309,523 | 1/1982 | Engelhardt et al. | 252/8.5 X |
| 4,357,245 | 11/1982 | Engelhardt et al. | 252/8.5 |
| 4,440,649 | 4/1984 | Loftin et al. | 252/8.5 |
| 4,451,631 | 5/1984 | Engelhardt et al. | . |
| 4,471,097 | 9/1984 | Uhl et al. | . |
| 4,478,727 | 10/1984 | Turner et al. | 252/8.5 |
| 4,502,964 | 3/1985 | Giddings et al. | 252/8.5 |
| 4,502,965 | 3/1985 | Giddings et al. | 252/8.5 |
| 4,502,966 | 3/1985 | Giddings et al. | 252/8.5 |
| 4,547,299 | 10/1985 | Lucas | . |

OTHER PUBLICATIONS

Commercial Bulletin on Uses and Properties of Natrol 42 and Similar Materials, by National Starch and Chemical Corporation, Bridgewater, N.J.
George R. Gray and H. C. H. Darley, Composition and Properties of Oil Well Drilling Fluids, Gulf Publishing Co., Houston (1980), p. 20.
J. M. Lucas, D. P. Enright, and A. C. Perricone, *Development of Vinylsulfonate Copolymers for Water-Base Drilling Muds*, Symposium on Advances in Oilfield Chemicals and Chemistry, American Chemical Society, St. Louis Meeting, Apr. 8–13, 1984.

*Primary Examiner*—Herbert B. Guynn
*Attorney, Agent, or Firm*—Alexander J. McKillop; Michael G. Gilman; Charles J. Speciale

[57] ABSTRACT

Various water-soluble additives, either alone or in various combinations, for use in water-based clay drilling fluids. The additives are an acrylate polymer, an acrylate propylene glycol copolymer and three structurally different sulfonate amide polymers. One of the sulfonate amide polymers is a terpolymer consisting of a random distribution of units of the formulae (a)

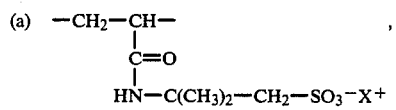

(b) 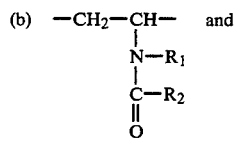 and (c)

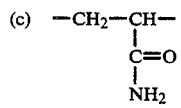

wherein $R_1$ and $R_2$ are the same or different and each is hydrogen, methyl, or ethyl, and $X^+$ is a cation. A second sulfonate amide polymer is a copolymer consisting only of a random distribution of units (a) and (b). The third sulfonate amide polymer is a copolymer consisting of 2-acrylamido-2-methyl propane sulfonic acid and acrylamide. The acrylate polymer is of the formula

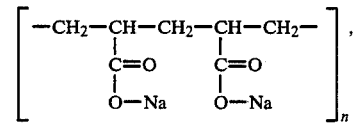

while the acrylate propylene glycol copolymer is of the formula

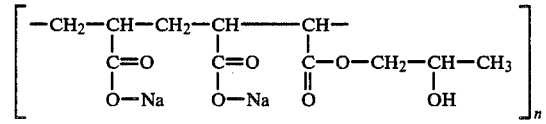

Drilling operations using a drilling fluid containing these compositions can be carried out at pH levels from about 8 to 11.5 and at temperatures up to about 220° C. The use of the above compositions in a water-based clay drilling fluid results in a reduced fluid loss rate.

4 Claims, No Drawings

ADDITIVE SYSTEMS FOR CONTROL OF FLUID LOSS IN AQUEOUS DRILLING FLUIDS AT HIGH TEMPERATURES

CROSS-REFERENCE TO RELATED CASES

Copending application Ser. No. 690,066, filed Jan. 9, 1985, relates to vinyl sulfonate amide copolymer and terpolymer combinations for control of filtration in water-based drilling fluids at high temperatures.

BACKGROUND OF THE INVENTION

This invention relates to improvements in aqueous clay-based drilling fluids with better enable drilling at high temperatures by decreasing fluid loss. Aqueous clay-based drilling fluids or muds are well-known in the prior art, as are different additives. Such fluids are comprised basically of water, a clay such as bentonite or sepiolite, lignosulfonate, a base such as NaOH, a densifier such as barite or barium sulfate, and possibly a salt containing a cation such as sodium or potassium. Other aqueous ionic compounds such as $Na^+Cl^-$ may also be present. These fluids are suitable for drilling at pH levels from about 8 to about 11.5.

As drilling temperatures in recent years have been increasing, the prior art has searched for additives to conventional aqueous or water-based drilling fluids to facilitate drilling at increased temperatures. One major problem some of these additives have tried to alleviate has been an increased fluid loss due to high-temperature drilling. U.S. Pat. No. 4,172,800, issued to Walker, discloses an additive mixture of a polyethoxylated sulfurized fatty acid and a polyalkylene glycol. U.S. Pat. No. 4,201,678, issued to Pye, et al, discloses a foaming solution suitable for drilling at up to 700° F., containing an amphoteric betaine, a salt of a linear aliphatic or alkyl aryl hydrocarbon sulfonate, and, optionally, an unneutralized ammonia. U.S.S.R. Pat. No. 883,140, issued to Boreholes Consolidated, discloses a drilling fluid containing a lignosulfonate, an acrylic polymer, potash alum, potassium hydroxide, and water. This fluid is used at temperatures up to 200° C. and at pH levels from 8 to 12.9. U.S. Pat. No. 4,478,727, issued to Turner, et al, discloses an additive consisting of a co-polymer of sodium styrene sulfonate-co-sodium-N-(4-sulfophenyl)-maleimide.

Other additives which have been used in drilling fluids are vinyl sulfonate amide polymers as described in U.S. Pat. No. 4,309,523 to Engelhardt, et al. Engelhardt discloses polymers consisting essentially of a random distribution of (a) 5 to 95% by weight of units of the formula

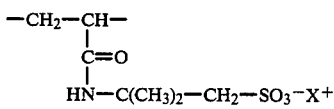

(b) 5 to 95% by weight of units of the formula

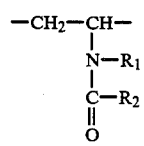

and (c) 0 to 80% by weight of units of the formula

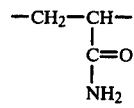

wherein $R_1$ and $R_2$ are the same or different and each is hydrogen, methyl, or ethyl, and $X^+$ is a cation. This composition has been used in a drilling fluid in U.S. Pat. No. 4,440,649, issued to Loftin, et al. Loftin discloses the use of the terpolymer in the Engelhardt patent as a fluid loss reducing and rheology stabilizing agent, either alone or in combination with pregelatinized starch and/or hydroxyethylcellulose. Loftin also uses organic cationic clay-stabilizing agents as well as water and a viscosity increasing agent. Loftin ages his fluids at temperatures up to 350° F. The fluid loss experiments disclosed in the Loftin reference are standard API fluid loss experiments done at room temperature. This test, as described in Gray and Darley, *Composition and Properties of Oil Well Drilling Fluids* (1980), pg. 20, subjects the mud to static filtration for 30 minutes, after which the volume of filtrate is measured through filter paper.

U.S. Pat. No. 4,451,631 and West German Offenlegungsschrift No. 3,027,422, issued to Engelhardt, disclose a terpolymer of a random distribution of units of the formulae (a) 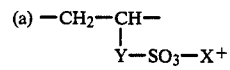

(b) 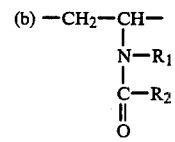

and (c) 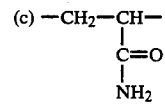

and partial hydrolysates thereof, wherein when $R_1$ is hydrogen, $R_2$ is hydrogen, methyl or ethyl, Y is $-CO-NH-C(CH_3)_2-CH_2-$ or a direct bond, and $X^+$ is a cation; when $R_1$ and $R_2$ are identical or different, each is hydrogen, methyl or ethyl or, together, are trimethylene, Y is $-CO-NH-C(CH_2)_2-$, and $X^+$ is a cation. U.S. Pat. No. 4,471,097, issued to Uhl, discloses polymers containing a distribution of (a) 5 to 95 wt.% of units of the formula

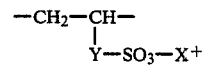

(b) 0 to 30 wt.% of units of the formula

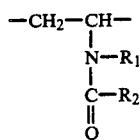

(c) 0 to 80 wt.% of units of the formula

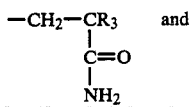

(d) 5 to 60 wt.% of units of the formula

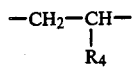

wherein $R_1$ and $R_2$ are the same or different and represent hydrogen, methyl, or ethyl or, together, are trimethylene to cyclic pentamethylene; $R_3$ is hydrogen or methyl; $R_4$ is an imidazolyl-(1) or imidazolyl-(2) moiety; Y is a single covalent bond or the formula $-CO-NH-C(CH_3)_2-CH_2-$, and $X^+$ is a cation.

U.S. Pat. Nos. 4,268,400 and 4,309,329, issued to Lucas et al, disclose terpolymers in drilling fluids containing acrylamide and hydroxyalkylacrylate groups, as well as a monovalent alkali metal salt of acrylic acid in the '400 patent or alkali metal acrylate units in the '329 patent. U.S. Pat. No. 4,283,517, issued to Perricone et al, discloses a process for making terpolymers of acrylamide, an alkali metal salt of acrylic acid, and a hydroxyalkyl acrylate. It also discloses a process for making copolymers of (meth)acrylamidoalkylsulfonic acid or alkali metal salt thereof and (meth)acrylamide or N-alkyl(meth)acrylamide. U.S. Pat. No. 4,293,427, issued to Lucas et al, discloses a copolymer of a (meth)acrylamido alkyl sulfonic acid or alkali metal salt thereof and a (meth)acrylamide or N-alkyl(meth)acrylamide. This copolymer can be used in an aqueous drilling fluid which can be aged at temperatures up to 325° F. Lucas also discloses API fluid loss experiments using this drilling fluid at room temperature.

Problems encountered in the prior art include increased fluid loss at high temperatures and/or the decomposition of some drilling fluid additives at high temperatures. The object of the present invention is to alleviate both of these problems with a new additive system for aqueous clay-based drilling fluids.

SUMMARY OF THE INVENTION

This invention is directed to aqueous clay-based drilling fluids containing separate and distinct water soluble sulfonate amide polymers, either alone or in combination with a water soluble acrylate or acrylate-propylene glycol polymer, or mixtures thereof.

DETAILED DESCRIPTION OF THE INVENTION

The present invention provides a stable aqueous clay-based drilling fluid which can be used in drilling operations at temperatures up to 220° C. while reducing fluid loss. The drilling fluids are conventional aqueous clay-based fluids which contain a novel combination of water-soluble additives comprising three separate and distinct water-soluble sulfonate amide polymers in combination with a water-soluble acrylate or acrylate-propylene glycol polymer, or mixture thereof.

The Sulfonate Amide Polymers

Sulfonate amide polymer 1, a terpolymer, consists essentially of a random distribution of units of the formulae (a) 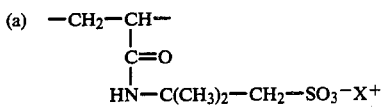

(b) 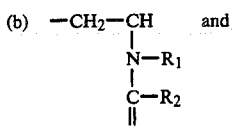

(c) 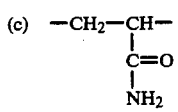

For sulfonate amide polymer 1, the terpolymer, a preferred composition of the additive consists of from 5 wt.% to 95 wt.% water-soluble 2-acrylamido-2-methyl-propane-3-sulfonic acid (AMPS), or unit (a), more preferably from 35 wt.% to 70 wt.%, from 5 wt.% to 95 wt.% N-vinyl-N-methylacetamide, or unit (b), preferably from 15 wt.% to 35 wt.%, and from greater than zero up to 80 wt.% of acrylamide, or unit (c), preferably from 10 wt.% to 30 wt.%.

Sulfonate amide polymer 2, a copolymer, consists only of a random distribution of units (a) and (b).

A preferred composition for sulfonate amide polymer 2 is from 5 wt.% to 95 wt.% water-soluble 2-acrylamido-2-methyl-propane-3-sulfonic acid (AMPS), or unit (a), more preferably from 60 wt.% to 80 wt.%, and from 5 wt.% to 95 wt.% N-vinyl-N-methylacetamide, or unit (b), more preferably from 20 wt.% to 40 wt.%.

A preferred embodiment of sulfonate amide polymer 1 is (HOE-2825 TM), and a preferred embodiment of sulfonate amide polymer 2 is (HOE-3118 TM), products of Hoechst Corp. In each sulfonate amide polymer, $R_1$ and $R_2$ are the same or different and each is hydrogen, methyl, or ethyl, and $X^+$ is a cation. The sulfonate amide polymers each have a molecular weight from about 200,000 to about 2,000,000.

These two polymers can be prepared by dissolving 2-acrylamido-2-methyl-propane-3-sulfonic acid in water, and then neutralizing this acid with a base, and adding a vinylacylamide of the formula

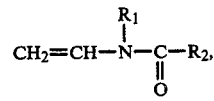

wherein R, and $R_2$ are the same or different and denote hydrogen, methyl, or ethyl. In sulfonate amide polymer 1, acrylamide is added, while in sulfonate amide polymer 2, it is not. The process of making these copolymers is more fully described in U.S. Pat. No. 4,309,523, which is incorporated by reference.

Sulfonate amide polymer 3, a copolymer, is a copolymer of acrylamide and 2-acrylamido-2-methyl propane sulfonic acid, also known as AMPS. In making this copolymer, acrylamide is used as the initial reagent in an amount from between about 30 mole % to about 91 mole %. To the acrylamide is added 2-acrylamido-2-methyl propane sulfonic acid in an amount between about 8 mole % to about 70 mole %. A preferred embodiment of sulfonate amide polymer 3 is (DFE-105 TM), a product of Milchem Incorporated. It has an estimated molecular weight by viscosity of about 2 million to about 5 million. The process of making sulfonate amide polymer 3 is more fully described in U.S. Pat. No. 4,293,427 and in J. M. Lucas, D. P. Enright and A. C. Perricone, *Development of Vinylsulfonate Copolymers for Water-Base Drilling Mud*, Symposium on Advances in Oilfield Chemicals and Chemistry, American Chemical Society, St. Louis Meeting, Apr. 8-13, 1984. These publications are herein incorporated by reference.

The Acrylate Polymer

The acrylate polymer is of the formula

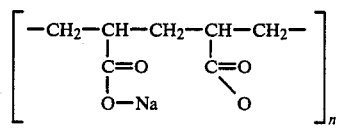

A preferred embodiment of this polymer is (Alcomer 72 TM), a product of Allied Colloid. The polymer is water-soluble and has a molecular weight up to about 50,000, preferably from about 5,000 to 20,000.

The Acrylate Propylene Glycol Polymer

The acrylate propylene glycol polymer, a copolymer, is water-soluble and has the formula

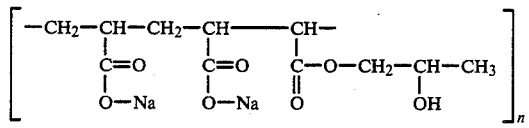

The preferred embodiment of the acrylate propylene glycol copolymer is (Natrol 42 TM) a product of National Starch and Chemical Corporation. This product is a 50% aqueous solution with a pH from 5 to 7, has a viscosity of 100 cps, a freezing point of $-20°$ C., and a density of 9.1 lbs./gallon. It is unaffected by freeze-thaw cycles and is anionic. It has a molecular weight of up to about 50,000, more preferably about 5,000 to 20,000.

The base fluid of the present invention is well known and is a water-based clay containing sea salt and inert densifiers. In the preferred embodiment, the water-based clay contains water, a clay mix, (Aquagel TM), which is a bentonite-based drilling clay, NaOH, sea salt, and Barite, which is an inert densifier known as $BaSO_4$. The density of this fluid is 11.8 lbs./gal.

To this base fluid is added various combinations of the polymeric additives of the present invention. Each additive can be present in an amount of about 0.25 to 6 lbs./bbl. of drilling fluid, or about 0.07 to 1.67 wt.% of drilling fluid. Total additive concentration is from about 0.5 to 12 lbs./bbl., or about 0.14 to 3.33 wt.%. More preferred concentrations for each polymer are from 0.5 to 5 lbs./bbl., or 0.14 to 1.39 wt.%. An even more preferred concentration for the acrylate polymer and also for the acrylate propylene glycol copolymer is from about 0.5 to 1 lb./bbl., or about 0.14 to 0.28 wt.%. For sulfonate amide polymer 3, a most preferred concentration is about 1 lb./bbl., or about 0.28 wt.%.

Drilling operations utilizing the compositions of the present invention can be carried out at a preferred pH range from 8 to 11.5. Before the drilling fluid is tested, it is aged at high temperatures, from 150° C. to 220° C., for time periods of from 16 to 32 hours. It is the object of the invention to carry out drilling operations at high temperatures. The present composition has been demonstrated at drilling temperatures up to 220° C., and at differential pressures ($\Delta p$) up to 100 psi. The following examples and tables show the preparation and use of the present invention. The claimed compositions remain stable at these high drilling temperatures while, at the same time, preventing excessive fluid loss.

EXAMPLE 1

An aqueous clay-based drilling fluid was prepared as follows:

5,600 ml $H_2O$, 90 g of (Aquagel TM) clay prepared from bentonite, and 540 g of a clay mix comprising 54 wt.% calcium montmorillants, 23% Mojave Desert clay, 17% bentonite, and 6% quartz and feldspar were stirred in a mechanical mixer at 8,500-9,000 rpm, and then allowed to age for about 48 hours. NaOH was then added to give the mixture a pH of 9.95. 75.4 g of "synthetic sea salt" (8,000 ppm $Cl^-$), 3,000 g of Barite, which is a barium sulfite densifying agent, and 2.5 ml of 36% NaOH to give a pH of 9.9 were then added. The density of the mixture was 11.8 lb./gal.

For the examples which follow, the apparatus used is a modified N. L. Baroid filter apparatus. The apparatus is comprised of a filter column surrounded by a heating jacket. The drilling fluid is placed in a reservoir leading to the filter column. The fluid is then passed through a filter resting on a screen support. When a valve is opened at various intervals, the fluid flows into a receiver and the fluid loss can then be measured.

For filtrations at high temperatures, the filter column was pressured to up to 400 psi and the receiver up to 300 psi, resulting in a $\Delta p$ value of up to about 100 psi.

In the preferred embodiment used in the following examples, the filter is two "specially hardened" Baroid No. 988 filter papers, and the screen support 5 is a 60μ stainless steel filter disc. The filtration area is 21 $cm^2$.

EXAMPLE 2

The drilling fluid as prepared in Example was aged for 16 hours at 200° C. A mixture of 200 ml of drilling fluid and 10 ml $H_2O$ was placed in the filter apparatus. Pressure difference ($\Delta p$) in the filter apparatus was 100 psi. The experiment was run at a drilling temperature of 200° C. Fluid loss measured as a function of time is shown in Table 1 below.

TABLE 1

| Time (min.) | Vol. (ml) | Time/Volume |
|---|---|---|
| 0.5 | 5.0 | .10 |
| 1 | 7.8 | .13 |
| 2 | 10.8 | .19 |
| 3 | 13.5 | .22 |
| 4 | 15.8 | .25 |
| 6 | 20.0 | .30 |
| 8 | 23.3 | .34 |

TABLE 1-continued

| Time (min.) | Vol. (ml) | Time/Volume |
|---|---|---|
| 10 | 26.2 | .38 |
| 12 | 29.0 | .41 |
| 15 | 33.2 | .45 |
| 20 | 41.0 | .49 |
| 25 | 49.0 | .51 |
| 30 | 55.0 | .55 |
| 35 | 63.0 | .56 |

EXAMPLES 3–6

These examples show various concentrations of sulfonate amide polymers 1 and/or 2 added to 12.5 ml of water and 250 ml of the drilling fluid as prepared in Example 1. This fluid was aged in each case at 200° C. for 16 hours. It was then placed in the filter apparatus at 200° C. and Δp of 100 psi. The volume of fluid loss in each example as a function of time is shown in Table 2.

TABLE 2

| Example | System | Conc. lbs./bbl. | Flow (ml) 4 min. | 8 min. | 15 min. | 30 min. |
|---|---|---|---|---|---|---|
| 3 | sulfonate amide polymer 1* | 4 | 9.6 | 13.3 | 17.5 | 23.5 |
| 4 | sulfonate amide polymer 2** | 4 | 7.1 | 9.9 | 13.7 | 19.8 |
| 5 | sulfonate amide polymer 1 | 2 | 8.0 | 12.0 | 16.8 | 23.0 |
|   | sulfonate amide polymer 2 | 2 |   |   |   |   |
| 6 | sulfonate amide polymer 1 | 3 | 12.5 | 17.6 | 22.5 | 29.3*** |
|   | sulfonate amide polymer 2 | 1 |   |   |   |   |

*HOE 2825 (41% AMPS, 31% N—vinyl-N—methylacetamide, 27% acrylamide)
**HOE 3118 (62% AMPS, 38% N—vinyl-N—methylacetamide)
***at 31 min.

EXAMPLE 7

A concentration of sulfonate amide polymer 1* at 1 lbs./bbl. (0.713 g) and a concentration of sulfonate amide polymer 2** at 3 lbs./bbl. (2.14 g) were added along with 12.5 ml of water, to 250 ml of the drilling fluid as prepared in Example 1. This fluid was then aged at 200° C. for 16 hours. It was then placed in the filter apparatus at 200° C. and Δp of 100 psi. The volume of fluid loss as a function of time is shown in Table 3.

Within the scope of this invention, an acrylate polymer such as (Alcomer 72 ™) or an acrylate propylene glycol copolymer such as (Natrol 42 ™) may be added to the sulfonate amide polymers of the composition of Examples 5–7.

TABLE 3

| Time (min.) | Vol. (ml) | Time/Volume |
|---|---|---|
| 0.5 | 2.4 | .21 |
| 1 | 3.5 | .29 |
| 3 | 4.8 | .42 |
| 4 | 6.3 | .63 |
| 6 | 7.7 | .78 |
| 8 | 8.7 | .92 |
| 10 | 9.8 | 1.02 |
| 12 | 11.0 | 1.09 |
| 15 | 11.7 | 1.28 |
| 20 | 13.5 | 1.48 |
| 25 | 15.3 | 1.63 |
| 30 | 16.8 | 1.79 |
| 35 | 17.7 | 1.98 |

*HOE 2825
**HOE 3118

EXAMPLES 8–14

Additives of sulfonate amide polymer 2, acrylate polymer, or acrylate propylene glycol copolymer and sulfonate amide polymer 2 combined with either acrylate propylene glycol or acrylate polymer were added to the drilling fluid as prepared in Example 1. In these examples, the total additive concentration was 4 lbs./bbl. of drilling fluid. The drilling fluid was aged for 16 hours at 150° C. prior to filtration at 200° C. Pressure difference (Δp) in the filter apparatus was 100 psi. The volume of drilling mud or fluid in each case was 200 ml. Fluid loss in ml was measured at intervals of 10, 25 and 30 minutes. The results are illustrated below in Table 4.

TABLE 4

Filtration Properties of A Water-Based Clay Drilling Fluid Containing Polymeric Dispersants at 200° C.

| Example | System | Fluid loss, ml 10 min. | 25 min. | 30 min. |
|---|---|---|---|---|
| 8 | No additive | 29.2 | 50.2 | 54.0 |
| 9 | Sulfonate Amide Polymer 2** (4 lbs/bbl) | 28.0 | 53.5 | 60.2 |
| 10 | Acrylate Polymer++ (4 lbs/bbl) | 11.7 | 18.2 | 20.2 |
| 11 | Acrylate Propylene Glycol Copolymer+ (4 lbs/bbl) | 11.0 | 17.0 | 18.2 |
| 12 | Sulfonate Amide Polymer 2 (3 lbs/bbl) and Acrylate Polymer (1 lb/bbl) | 8.4 | 13.5 | 14.9 |
| 13 | Sulfonate Amide Polymer 2 (3 lbs/bbl) and Acrylate Propylene Glycol Copolymer (1 lb/bbl) | 6.0 | 9.0 | 9.9 |
| 14 | Sulfonate Amide Polymer 2 (3 lbs/bbl) and 50% Acrylate Propylene Glycol Copolymer (1 lb/bbl) | 6.1 | 9.7 | 10.7 |

**HOE-3118
+Natrol 42 - Mol wt. 5,000 to 20,000
++Alcomer 72 - Mol wt. 5,000 to 20,000

EXAMPLES 15–18

Mixtures of sulfonate amide polymer 2 and acrylate propylene glycol copolymer were added to the drilling fluid as prepared in Example 1 in concentrations up to 4 lbs./bbl. and then aged up to 32 hrs. at temperatures up to 220° C. and filtered at temperatures up to 220° C. The results are shown below in Table 5. Fluid loss in ml was measured at intervals of 4 min., 8 min., 15 min., and 30 min. The initial volume of drilling mud or fluid was 200 ml in each example.

TABLE 5

| Example | System | Aging Time | Aging Temp (°C.) | Filtering Temp (°C.) | Fluid Loss, ml 4 min. | 8 min. | 15 min. | 30 min. |
|---|---|---|---|---|---|---|---|---|
| 15 | No additive | 16 hrs. | 150 | 200 | 16.7 | 25.2 | 40.4 | 54.0 |
| 16 | Sulfonate amide | 16 hrs. | 200 | 200 | 4.5 | 6.1 | 8.0 | 11.1 |

TABLE 5-continued

| Example | System | Aging Time | Aging Temp (°C.) | Filtering Temp (°C.) | Fluid Loss, ml | | | |
|---------|--------|------------|------------------|----------------------|----------------|---|---|---|
| | | | | | 4 min. | 8 min. | 15 min. | 30 min. |
| | polymer 2** (3 lbs/bbl) and Acrylate propylene glycol copolymer+ (½-lb/bbl) | | | | | | | |
| 17 | Sulfonate Amide Polymer 2 (3 lbs/bbl) and Acrylate Propylene Glycol Copolymer (1-lb/bbl) | 32 hrs. | 200 | 200 | 4.2 | 5.0 | 6.5 | 9.7 |
| 18 | Sulfonate Amide Polymer 2 (3 lbs/bbl) and Acrylate Propylene Glycol Copolymer (1 lb/bbl) | 16 hrs. | 220 | 220 | 5.2 | 7.3 | 9.8 | 14.2 |

**HOE-3118
+Natrol 42

EXAMPLES 19–22

Additives of sulfonate amide polymers, 1, 2, or 3 were added, either in combination or with the acrylate propylene glycol copolymer, to the drilling fluid as prepared in Example 1. Total additive concentration was 4 lbs./bbl. The drilling fluid was then aged for 16 hours at 150° C. and then filtered at 150° C. Fluid loss in ml was measured at intervals of 4 min., 8 min., 15 min., and 30 min. The results are shown in Table 6 below.

In a similar manner, an acrylate polymer such as (Alcomer 72 TM) or an acrylate propylene glycol copolymer such as (Natrol 42 TM) may be added to the sulfonate amide polymer composition of Examples 20 and 21.

TABLE 6

| Example | System | Concentration lbs./bbl. | Fluid Loss, ml | | | |
|---------|--------|-------------------------|----------------|---|---|---|
| | | | 4 min. | 8 min. | 15 min. | 30 min. |
| 19 | No additive | — | 10.0 | 14.0 | 20.0 | 29.2 |
| 20 | Sulfonate amide polymer 2** | 3 | 4.8 | 6.7 | 8.5 | 10.7 |
| | Sulfonate amide polymer 3*** | 1 | | | | |
| 21 | Sulfonate amide polymer 1* | 3 | 4.0 | 5.5 | 7.0 | 9.9 |
| | Sulfonate amide polymer 3*** | 1 | | | | |
| 22 | Sulfonate amide polymer 2** | 3 | 3.7 | 5.3 | 7.5 | 10.8 |
| | Acrylate propylene Glycol copolymer+ | ½ | | | | |

*HOE 2825
**HOE 3118
***DFE 105
+Natrol 42

EXAMPLES 23–25

Additives as described in Examples 19–22 were added to the drilling fluid as prepared in Example 1. The total concentration of additive was up to 4 lbs./bbl. The fluid was then aged for 16 hours at 200° C. and then filtered at 200° C. Fluid loss in ml was measured at intervals of 4 min., 8 min., 15 min., and 30 min. The data is shown below in Table 7. The control for this data is the same as that in Examples 2 and 9.

TABLE 7

| Example | System | Concentration lbs./bbl. | Fluid Loss, ml | | | |
|---------|--------|-------------------------|----------------|---|---|---|
| | | | 4 min. | 8 min. | 15 min. | 30 min. |
| 23 | Sulfonate amide polymer 2** | 3 | 14.8 | 19.5 | 24.8 | 34.3 |
| | Sulfonate amide polymer 3*** | 1 | | | | |
| 24 | Sulfonate amide polymer 1* | 3 | 8.0 | 11.5 | 17.5 | 28.3 |
| | Sulfonate amide polymer 3*** | 1 | | | | |
| 25 | Sulfonate amide polymer 1** | 3 | 7.3 | 10.0 | 13.8 | 19.5 |
| | Acrylate propylene glycol copolymer+ | 1 | | | | |

*HOE 2825
**HOE 3118
***DFE 105
+Natrol 42

What is claimed is:

1. A water-based clay drilling fluid containing from 0.25 lbs./bbl. to 6 lbs./bbl. of
   (A) sulfonate amide polymer 2, a water-soluble sulfonate amide copolymer, having a molecular weight of about 200,000 to 2 million and consisting of a random distribution of units of the formulae (a) 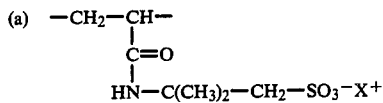

in a proportion of 60 wt.% to 80 wt.% of the weight of the copolymer, and (b) 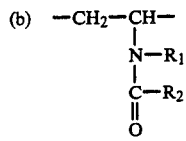

in a proportion of 20 wt.% to 40 wt.% of the weight of the copolymer,
   wherein $R_1$ and $R_2$ are the same or different and each is hydrogen, methyl, or ethyl, and $X^+$ is a cation, and
   (B) 0.25 lbs./bbl. to 6 lbs./bbl. of an acrylate polymer of the formula

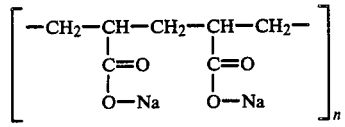

wherein said acrylate polymer has a molecular weight less than 50,000, and wherein the weight ratio of said sulfonate amide copolymer to said acrylate polymer is about 3:1.

2. A water-based clay drilling fluid containing from 0.25 lbs./bbl. to 6 lbs./bbl. of
   (A) sulfonate amide polymer 2, a water-soluble copolymer, having a molecular weight of about 200,000 to 2 million and consisting of a random distribution of units of the formulae (a) 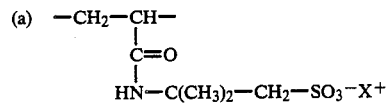

in a proportion of 60 wt.% to 80 wt.% of the weight of the copolymer, and (b) 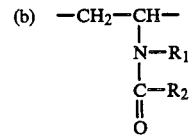

in a proportion of 20 wt.% to 40 wt.% of the weight of the copolymer, and
   wherein $R_1$ and $R_2$ are the same or different and each is hydrogen, methyl, or ethyl, and $X^+$ is a cation, and
   (B) 0.25 lbs./bbl. to 6 lbs./bbl. of a water-soluble acrylate propylene glycol copolymer of the formula

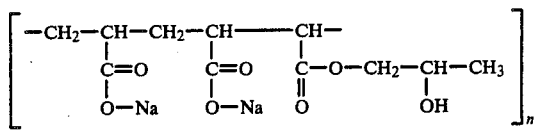

having a molecular weight of less than 50,000, and wherein the weight ratio of said sulfonate amide copolymer to said acrylate propylene glycol copolymer is about 3:1.

3. A water-based clay drilling fluid containing from 0.25 lbs./bbl. to 6 lbs./bbl. of
   (A) sulfonate amide polymer 1, a water-soluble terpolymer, having a molecular weight of about 200,000 to 2 million and consisting of a random distribution of units of the formulae (a) 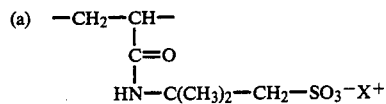

in a proportion of 35 wt.% to 70 wt.% of the weight of the terpolymer, (b) 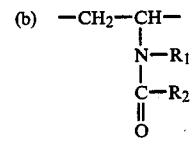

in a proportion of 15 wt.% to 35 wt.% of the weight of the terpolymer, and (c) 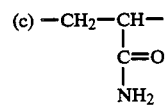

in a proportion of 10 wt.% to 30 wt.% of the terpolymer,
   wherein $R_1$ and $R_2$ are the same or different and each is hydrogen, methyl, or ethyl, and $X^+$ is a cation, and
   (B) from 0.25 lbs./bbl. to 6 lbs./bbl. of a water-soluble acrylate propylene glycol copolymer of the formula

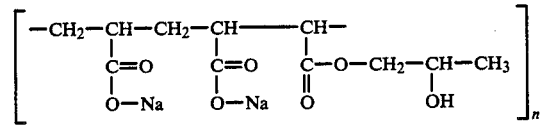

having a molecular weight of less than 50,000, and wherein the weight ratio of said sulfonate amide terpolymer to said acrylate propylene glycol copolymer is about 3:1.

4. In a method of drilling a well wherein a drilling fluid is circulated in the well while drilling at a temperature up to about 220° C., the improvement of employing as said drilling fluid an aqueous clay base drilling fluid having a pH from 8 to 11.5 which contains the composition of any one of claims 1, 2 or 3 as a fluid loss reducing agent.

* * * * *